United States Patent [19]

Shoiket

[11] 4,095,687
[45] Jun. 20, 1978

[54] ESCAPEMENT MECHANISM FOR PALLET CONTROL

[75] Inventor: Henry N. Shoiket, Rutherford, N.J.

[73] Assignee: Standard Tool & Manufacturing Co, Lyndhurst, N.J.

[21] Appl. No.: 734,005

[22] Filed: Oct. 19, 1976

[51] Int. Cl.² .............................................. B65G 21/20
[52] U.S. Cl. .............................................. 198/345
[58] Field of Search ............... 198/345, 343, 339, 459, 198/460, 341; 193/35 A, 35 C

[56] References Cited

U.S. PATENT DOCUMENTS

| | | | |
|---|---|---|---|
| 1,440,288 | 12/1922 | Gray | 198/459 |
| 2,675,119 | 4/1954 | Birch | 198/459 |
| 2,772,416 | 12/1956 | Dorosz et al. | 198/341 X |
| 3,650,373 | 3/1972 | Kern et al. | 198/345 |
| 3,690,433 | 9/1972 | Buldini | 198/339 X |
| 3,858,707 | 1/1975 | Block et al. | 198/345 |

*Primary Examiner*—Evon C. Blunk
*Assistant Examiner*—Douglas D. Watts
*Attorney, Agent, or Firm*—Harness, Dickey & Pierce

[57] ABSTRACT

In a pallet-advancing machine where friction plates on a pair of spaced chains directly engage the bottom face of the pallets near the side edges leaving the central part of the underface of the pallets free. An escapement mechanism embodies a shaft which is mounted adjacent to one or more stations on the center line of the pallets for rotational movement. Stop lugs are mounted on the shaft in position to stop a pallet with one type of stop block at a work station and a pallet with another type of block at a waiting station. By rotating the shaft, the advancement of a pallet into the work station is accurately controlled at the time another pallet is stopped at the waiting station. Two pallets may be advanced at the same time to have one or both located at one or adjacent work stations, the positions for which are accurately controlled by the angular rotation of the shaft first in one direction then in the other direction.

11 Claims, 8 Drawing Figures

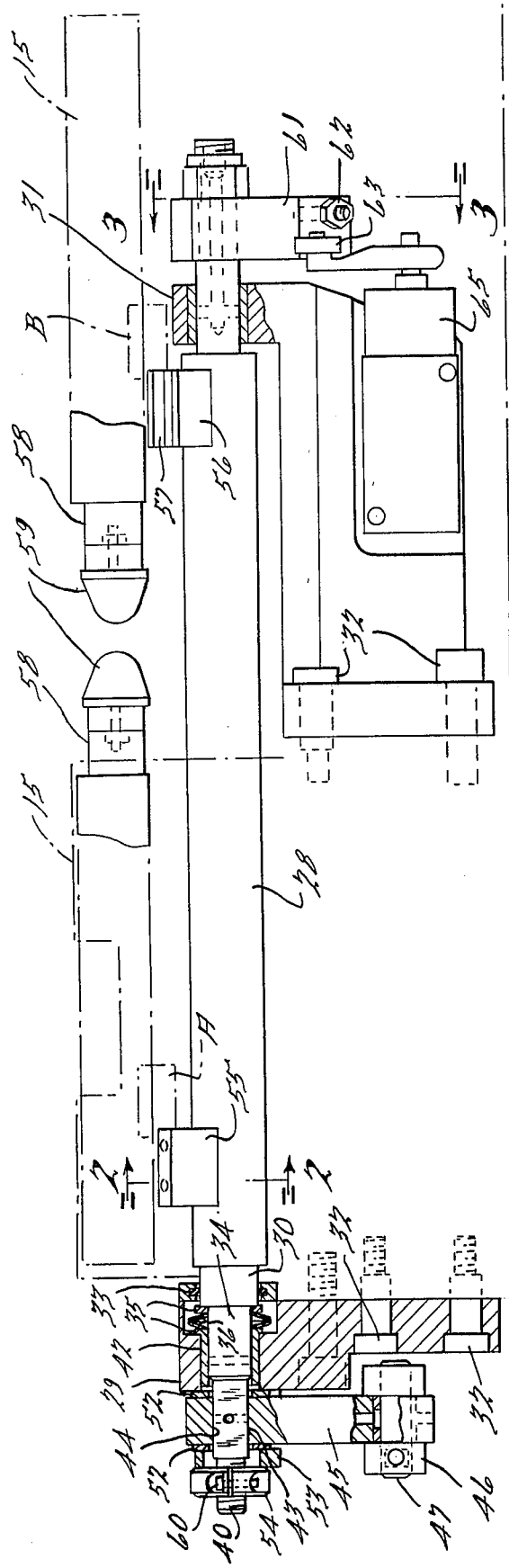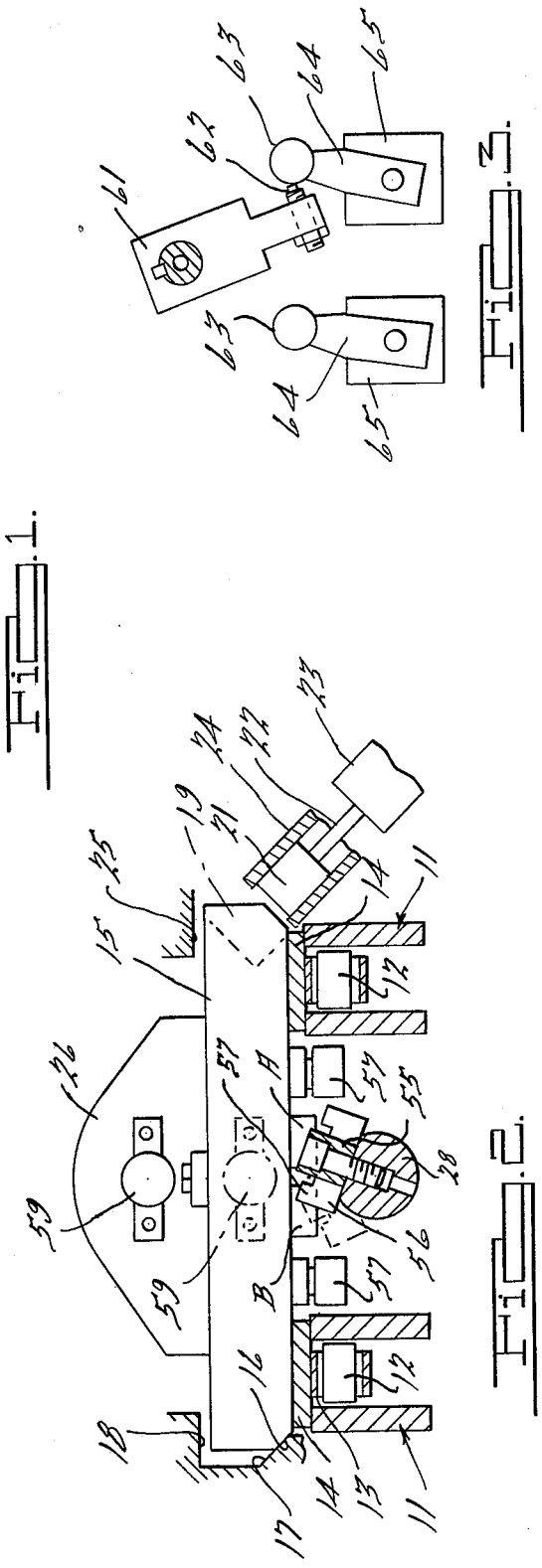

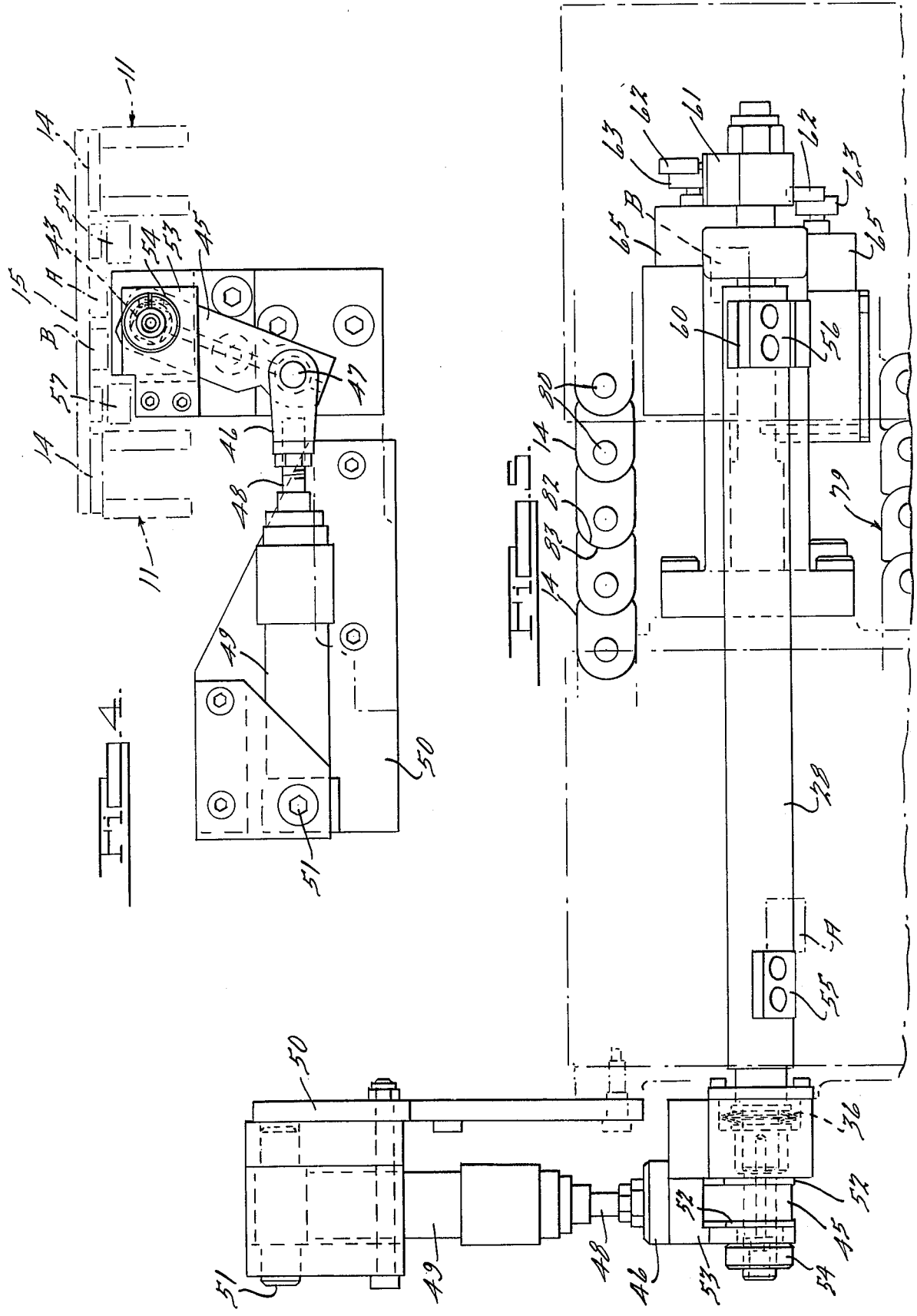

ESCAPEMENT MECHANISM FOR PALLET CONTROL

BACKGROUND OF THE INVENTION

Reference may be had to applicant's U.S. Pat. Nos. 3,708,051 and 3,785,031 which show longitudinally movable rods which are rotatable for positively moving pallets into and out of stations through the longitudinal movement of the angularly adjusted rods. In the present arrangement, the shaft is not moved longitudinally and the pallets are raised and lowered from and to the chains at the work station and accurately positioned when the workpiece thereon is being machined as illustrated in said above set forth patents. The pallets are advanced by a pair of chains having friction plates which engage the pallets at the side bottom edges thereof.

SUMMARY OF THE INVENTION

The invention pertains to a pallet control shaft which is rotated by a ram through an angle of approximately 30° for positioning stop lugs thereon which are located to engage stop blocks extending downwardly from the underside of the pallets but in line with the lugs on the shaft so that in one position of the shaft the forward pallet arriving at a work station is stopped by one lug while a second lug stops the following pallet. Every other pallet in a flow of pallets has a stop block on one side of the pallet center line while those in between have stop blocks on the opposite side of the center line. In this manner, the pallets are provided with stop blocks which are in alternate positions throughout the supply of pallets. The shaft has the same lug at the work station end and may have these same or a bifurcated lug at the waiting station. The shaft is mounted in bearings with a washer on a forward shoulder which engages a pair of Belleville washers to provide resiliency which reduces impact and eliminates shock when the stop blocks on the pallets are advanced against the lugs. The amount of tension thus provided may be controlled by a nut on a thread at the forward end of the shaft. A lever has a square hole disposed over a square form on the forward end of the shaft with the opposite end of the lever having a bifurcated element pivoted thereto and connected to the piston rod of the ram which is pivoted to the supporting structure at the work station. The opposite end of the shaft is provided with an arm which is moved angularly when the shaft is rotated to engage levers on micro-switches which are utilized to show in what position the shaft is in after being actuated by the ram. When a single station is provided, the forward pallet is stopped thereat and accurately located and clamped when raised from the pair of drive chains. The following pallet is stopped at the following waiting station and is retained until the pallet at the work station is moved therefrom when the shaft is rotated to its previously occupied position. The shaft is also constructed to stop pallets at a pair of stations and advance them from one to the other station or to retain them at both stations for a work operation requiring twice the time and releasing both pallets simultaneously when advancing two following pallets into the stations.

BRIEF DESCRIPTION OF THE DRAWINGS

FIG. 1 is a view in side elevation of a work station into which pallets are advanced embodying features of the present invention;

FIG. 2 is a sectional view of the structure illustrated in FIG. 1, taken on the line 2—2 thereof;

FIG. 3 is a sectional view of the structure illustrated in FIG. 1, taken on the line 3—3 thereof;

FIG. 4 is an end view of the structure illustrated in FIG. 1, as viewed from the left-hand end thereof;

FIG. 5 is a plan view of the structure illustrated in FIG. 1;

DESCRIPTION OF THE PREFERRED EMBODIMENTS

Figure 6:
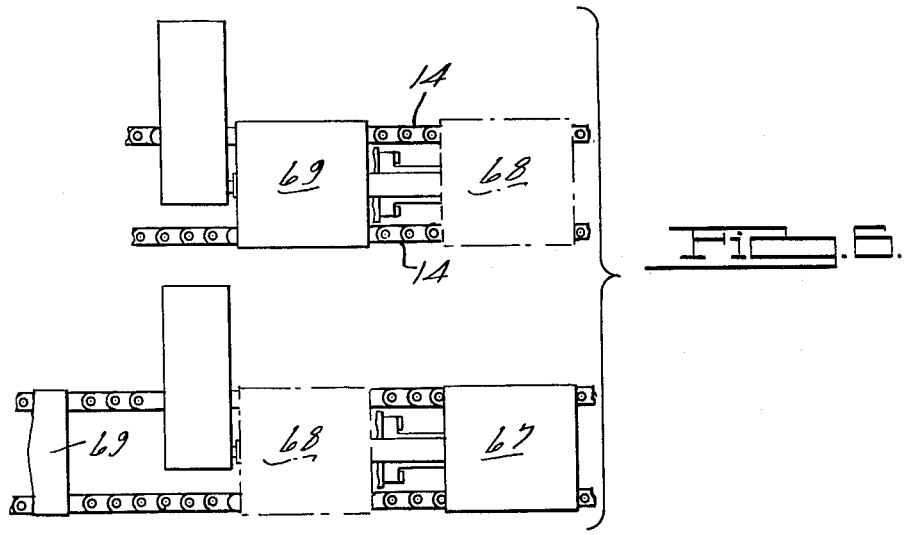
FIG. 6 is a schematic view of the device shown in FIGS. 1-5 when one work station is employed.

Referring to FIGS. 1-5 inclusive, a support 11 is provided at each side of the base structure between which a pair of roller chains 12 are driven having on the top links 13 wear plates 14 which engage the under outer side surfaces of a series of pallets 15. The pallets are of rectangular form having sloping bottom side edges 16, the one on the left-hand side being illustrated in FIG. 2 as engaging a sloping surface 17 of the machine support with the top surface of the pallet below an accurately positioned stop surface 18. The opposite side of the pallet contains a V-groove 19. A V-shaped head 21 on a piston rod 22 of a ram 23 is supported for reciprocation in tracks 24. When the head 21 is moved into engagement with the V-slot it positions the pallet longitudinally and shifts it to the left to further position the pallet as it is raised against the stop surface 18 and a similar stop surface 25 above the opposite edge of the pallet. This shifts the work which is secured on a fixture 26 into accurate machining position both laterally and longitudinally and clamps the pallet in the machining position. It will be noted that a lateral upward force is applied to the pallet by the V-shaped head 21 so that it will be shifted in both directions before being clamped. It will be noted that upon raising the pallet to clamp position, that the bottom face moves from the wear plates 14 so as to eliminate any wear when the pallet is in clamped position.

The driving of the pallet by wear plates 14 at the side edges of the bottom face, leaves the central portion of the pallet free to be controlled by a rotatable shaft 28 mounted at each work station. The shaft 28 is journaled in bushings 42 and 40 secured to the base structure in brackets 29 and 31 by a plurality of screws 32. The left-hand end of the shaft 28 has a shouldered portion 30 which is sealed by a sealing element 33. A reduced portion 34 has a washer 35 thereon between which the end of the bushing 42 and a pair of Belleville washers 36 are disposed which permits the longitudinal shifting of the shaft 28. A square end portion 43 of the shaft 28 is received in a square hole 44 in a lever 45. This permits the longitudinal movement of the square end portion 43 within the square hole 44 in the lever 45 the opposite end of which is secured between the arms of a bifurcated element 46 secured thereto by a pin 47. The element 46, as illustrated in FIGS. 4 and 5, is connected to a piston rod 48 of a ram 49 which is secured to the base structure by a bracket 50 on a pivot pin 51. A pair of washers 52 are provided on the end of the shaft 28 on each side of the lever 45 in engagement with a fixed element 53 which prevents the shifting of the lever 45 to the left or right. A thread on the end of the extension 43 of the shaft 28 has a nut 54 thereon which may be tightened to preset the spring thrust on the Belleville washers 36 by the shaft as it is longitudinally moved. The nut 54 after tightening is locked to the threaded shaft extension 43 by a split wall and a screw 60 for drawing the walls together.

The shaft 28 is provided with a lug 55 on a flat at its left-hand end, as viewed in FIGS. 1, 4 and 5, in position to engage a stop block A secured to the underside of the pallet 15 on the right-hand side of the center line of the pallet. A bifurcated lug 56 is mounted on a flat at the right-hand end of the shaft 28, having a projecting end 57 in position to engage a stop block B on the following pallet 15 to stop the pallet in the waiting station in the rear of the work station, as illustrated in FIG. 1. As illustrated in FIGS. 2 and 4, the bottoms of the pallets have downwardly extending rollers 57 which guide the pallet relative to the inner supporting elements 11 around the bends in which the chains 12 are driven as the pallets are advanced. The pallets also have supports 58 on the end facing surfaces for supporting bumpers 59 which are free to engage each other as the pallets are driven between stations.

It will be noted in FIG. 1 that the bumper 59 on the right-hand pallet in the waiting station is spaced from the rear bumper of the pallet in the work station so as not to disturb the clamping of the pallet in the work station where it must be accurately located when the machine operation is being performed. As the pallets are stopped by the engagement of the stop blocks A and B, with the lugs 55 and 56, respectively, the shock to the shaft 28 is absorbed by the spring Belleville washers 36 so as to prevent damage to the engaged parts. It will be noted that the advanced pallet at the working station has a stop block A on one side of the center line and that the following pallet has a stop block B on the opposite side of the center line. Every alternate pallet in the entire line has alternating stop blocks A and B throughout the series of pallets so that both can be stopped and released simultaneously at a station.

The right-hand end of the shaft 28 has an arm 61 affixed thereto for angular movement with the shaft when rotated. As illustrated in FIG. 3, when the arm is moved in one direction, a set screw 62 thereon operates a roller 63 on an arm 64 of a limit switch 65 and when reversed the roller is released permitting the return of the arm to its original position. A second adjustable screw 62 on the arm 61 when reversed operates a roller 63 on an arm 64 on a limit switch 65 which provides indications of what position the shaft is in, that is to say, in a position where the piston rod 48 is extended or retracted relative to the cylinder of the ram 49. While the bumpers 59 are illustrated attached to the adjacent faces of the pallets 15, it will be noted in FIG. 2 that a similar bumper 59 is attached to the fore and aft faces of a fixture 26 which supports a workpiece at the station.

When pallets 67, 68 and 69 are advanced to a single work station as illustrated in FIG. 6, the piston rod 48 of the ram 49 is retracted as illustrated in the figures. In this position, the stop block A on the pallet 69 is advanced with the chains 12 until it strikes the lug 55 on the shaft 28 where it is stopped at the work station and accurately located longitudinally and transversely by the operation of the ram 23 and the outward movement of the V-block 21. This locates the pallet 69 against the surfaces 18 and 25 disposed thereabove raising the pallet from the wear plates 14 of the chains. The next advancing pallet 68 has its stop block B engaged by the bifurcated lug 56 to prevent contact between the bumpers 59 of the pallets which would disturb the pallet 69 thereahead when in clamped position. Any shock which may occur to the shaft 28 by the striking of the stop blocks A and B with the lugs 55 and 56, respectively, is absorbed by the Belleville washers 36 since the square end 43 of the shaft 28 is permitted to move within the square opening 44 in the lever 45. The shock is not transmitted to the ram 49 since the shaft moves freely in an axial direction through the square hole in the lever 45 which is restrained from axial movement by the fixed elements 53.

Upon completion of the work cycle, the pallet 69 at the working station is unclamped by the reverse movement of the ram 23 and is permitted to drop downwardly onto the wear plates 14 of the chains. The piston rod 48 of the cylinder 49 is extended its full amount to rotate the shaft 28 clockwise. This moves the lug 55 from engagement with the stop block A releasing the pallet 69 and permitting it to be carried by the chains from the station. The shaft rotation simultaneously lowers the left projection of the lug 56 and raises the right projection to free the block B on the pallet 68 at the waiting station. As the pallet 68 is advanced by the chains 12, the stop block A thereof engages the lug 55 at the work station where it is raised to accurately located clamped position. The stop block B on the following pallet 67 will be stopped in the waiting station by the raised right projection of the lug 56 and in this manner the lugs operate at the working and waiting stations alternately to stop and release adjacent pallets simultaneously. Upon the return of the piston rod 48 within the cylinder of the ram 49 in the position illustrated in FIGS. 4 and 5, the initial relationship between the lugs 55 and 56 and the stop blocks A and B will be the same as originally described and as illustrated in the figures. In practice, the presence of pallets in the working and waiting stations and downstream thereof will be detected by limit switches (not shown) or similar means, so that the escapement cylinder is actuated only when pallets are present in both of the stations and when there is empty space downstream to accept the pallet 69 freed from the working station.

Figure 7:
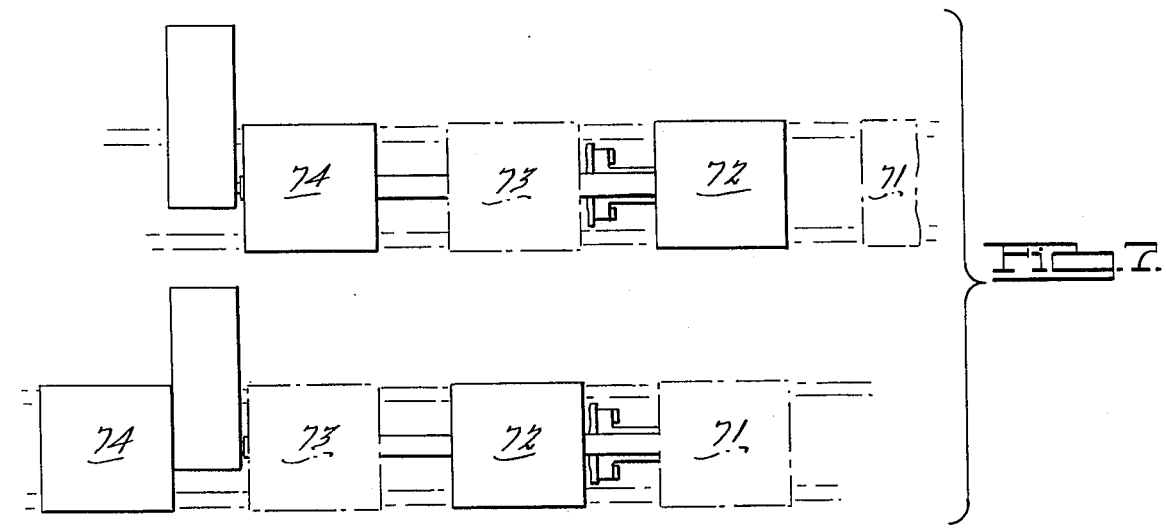
FIG. 7 is a schematic view of the device illustrated in FIGS. 1-5 when two working stations are employed to which the pallets are individually advanced seriatim.

It is sometimes necessary to operate two working stations located adjacent to each other with the pallets being passed from a waiting position to a first working station and then to a second working station where work operations are performed. Each of the stations will have a locating and clamping unit embodying the stop surfaces 18 and 25 and the locating ram 23. The shaft 28 is lengthened to support three lugs, a lug 55, a bifurcated lug 56 and an additional lug 55 in equal spaced relation to each other. As the stop blocks A and B on the pallets alternate positions, three pallets 72, 73 and 74 are stopped by the respective lugs when engaging the stop blocks A–B–A as illustrated in FIG. 7. The outward movement of the piston rod 48 of the ram 49 will release all of the pallets permitting the first pallet 74 to leave the advanced work station, the second pallet 73 to move from the following work station into the advanced work station, and the third pallet 72 at the waiting station to move into the following work station. The free pallet 71 with a stop block B will then be stopped at the waiting station so that the final position of the pallets will thus be B-A-B. After the work cycle has been performed at the two stations, the retracting of the piston rod 48 within the ram 49 will again produce the release of the pallets 73, 72 and 71 from positions A—B-A, permitting them to leave the advanced work station and the following work station and moving the next two pallets into the two stations with a free pallet moved into the waiting station. Normally the pallet detecting means, such as the limit switches pointed out above, will permit the operation of the escapement ram 49 only when there is a pallet waiting to be advanced toward the work station and an empty space is provided ahead of the station.

Figure 8:
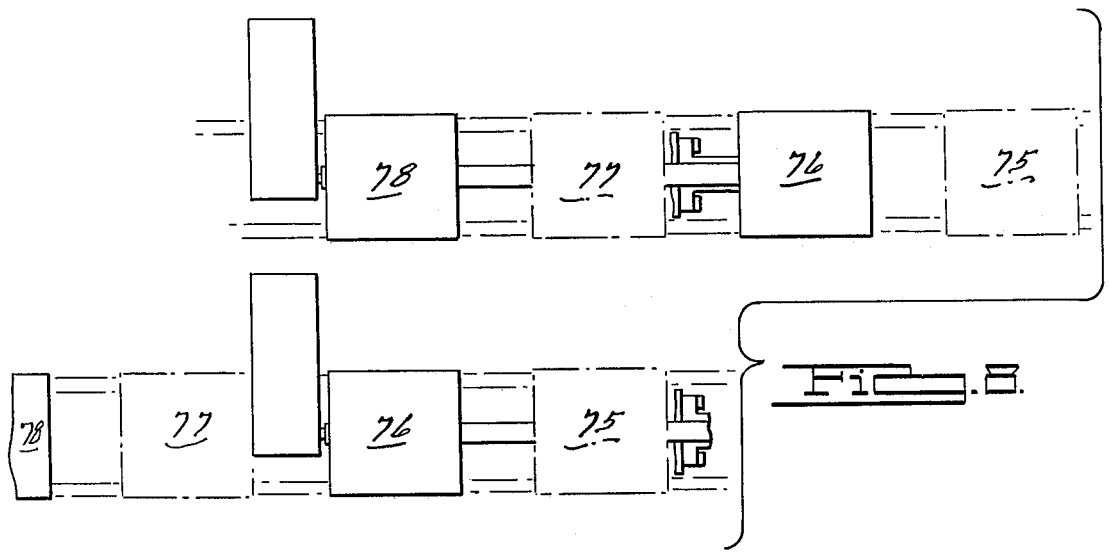
FIG. 8 is a schematic view of the structure illustrated in FIGS. 1-5 when two pallets are simultaneously advanced into two working stations and simultaneously moved therefrom to permit maximum operation time which is twice that employed at single stations.

When the work operation in a particular work station takes up a greater length of time than required at other stations, it may be advantageous to double the tooling for the slow operations on two adjacent work stations and machine two workpieces simultaneously. The total production time for machining the two parts is not increased over that required for a single part at other stations. The arrangement is identical to that above described for two adjacent stations except for the lugs on the shaft 28. The function of the escapement shaft and lugs is to release both pallets at the work stations for advancement by the chains along the supporting base ahead of the stations, while permitting two additional pallets to be moved into the work stations and be stopped thereat and clamped in fixed accurately located positions. In this arrangement, as illustrated in FIG. 8, the three pallets 76, 77 and 78 have been stopped in the order of A-B-A. Pallet sensing switches (not shown) operated by cams or other elements mounted on fixtures or on pallets register the presence of the two pallets 77 and 78 in the working stations and two pallets 75 and 76 waiting in the waiting stations with empty spaces for two pallets ahead of the two work stations for the reception of the pallets 78 and 77 when released from the work stations. When the piston rod 48 of the ram 49 is extended and the lugs 55 and 56 release the stop blocks A-B-A-B of the pallets 78, 77, 76 and 75, they are permitted to be advanced by the chains 12 to and from the work stations. The pallets 75 and 76 are advanced to the work stations as the pallets 77 and 78 are moved therefrom. Additional pallets are advanced to the waiting stations in position to move into the work stations. The timing of the advancement of the pallets from the stations is twice that for the pallets which are moved to and from individual stations, thus permitting twice the time to be used in a machining operation on the workpiece at each of such working stations.

It will be noted in FIGS. 4, 5 and 6 that each pin 80 of the chains 12 has a wear plate 14 freely pivoted thereon when resting on spaced rails 11 between which the chains 12 are advanced. While the individual wear plates 14 may take various forms, the wear plates 14 herein illustrated are of crescent shape having concave and convex mated surfaces 82 and 83 on opposite ends. This reduces resistance at the surface of the plates 14 and the drag on the chains 12.

What is claimed is:

1. In a pallet control and advancing mechanism, a supporting structure, spaced chains having supporting wear plates driven on said structure, pallets resting on said wear plates and advanced by said chains by the friction engagement between the wear plates and pallets, an escapement mechanism at a work station having a shaft mounted for rotation located between the chains where it extends parallel therewith, a stop block on each pallet disposed on opposite sides of the pallet center line on alternate pallets of a series, lugs on said shaft, one of said lugs engaging a stop block on a pallet at the work station, the other lug being spaced from the first lug for engaging a stop block on a following pallet for stopping the pallet at a following station, and means for rotating said shaft for releasing said stop block at said stations and for engaging the stop block on the following pallet to permit the chains to advance the pallets from and to said work station.

2. In a pallet control and advancing mechanism as recited in claim 1, wherein said following station is a waiting station.

3. In a pallet control and advancing mechanism as recited in claim 1, wherein said following station is also a work station, the following pallet in the second said work station being advanced to the first said work station when the shaft is again rotated.

4. In a pallet control and advancing mechanism as recited in claim 1, wherein said following station is a work station, into both of the work stations the pallets are simultaneously advanced and released to pass from both stations as two following pallets are advanced thereinto.

5. In a pallet control and advancing mechanism as recited in claim 1, wherein a raising, locating, and clamping mechanism is actuated at each work station to accurately locate a workpiece carried by the pallets in said work stations.

6. In a pallet control and advancing mechanism as recited in claim 2, wherein said pallets at the work and waiting stations are both stopped by the stop blocks thereof while being advanced by the chains into engagement with the lugs on the shaft when rotated to one position and when the shaft and lugs are rotated to a second position where the stopped pallets are released and advanced to have the pallet from the waiting station stopped at said work station as the pallet at the work station is advanced therefrom by the chains.

7. In a pallet control and advancing mechanism as recited in claim 1, wherein an operating lever is provided for rotating the shaft which has a square end, said operating lever having a square hole engaging the square end of said shaft to produce a drive therefor, and mounting means for the shaft which permits the shaft to advance longitudinally while the lever is retained against advancement therewith when the lugs on the shaft are struck by the stop blocks disposed on the series of pallets.

8. In a pallet control and advancing mechanism as recited in claim 7, wherein spring means on said shaft is deflected upon the advancement of the shaft when the lugs thereof are engaged by the stop blocks to reduce the shock thereof.

9. In a pallet control and advancing mechanism as recited in claim 7, wherein the shaft has a first lug for engaging a stop block A on one side of the pallet center line and a second lug on the shaft for engaging a stop block B on the other side of the center line on a following pallet, and means for rotating said shaft for releasing the pallet having the stop block A at the work station and stopping the pallet having the stop block B at said station.

10. In a pallet control and advancing mechanism as recited in claim 9, wherein a second lug on the shaft is bifurcated to have two extending end sections, one engaging the stop block B for stopping a pallet at the following station which, when the shaft is again rotated, moves the extending engaged end downwardly from the pallet to produce its release and moves the other end in a position to engage a stop block A to stop the next following pallet at the following station.

11. In a pallet control and advancing mechanism as recited in claim 10, wherein the first lug on the shaft has been moved to a position where it will engage the stop block B on the pallet which was released from the following station so as to be stopped within the work station.

* * * * *